(12) United States Patent
Masuda

(10) Patent No.: US 12,044,179 B2
(45) Date of Patent: Jul. 23, 2024

(54) FLUID SUPPLY SYSTEM

(71) Applicant: IHI Corporation, Tokyo (JP)

(72) Inventor: Seiei Masuda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 694 days.

(21) Appl. No.: 17/176,372

(22) Filed: Feb. 16, 2021

(65) Prior Publication Data

US 2021/0164399 A1 Jun. 3, 2021

Related U.S. Application Data

(63) Continuation of application No. PCT/JP2019/033849, filed on Aug. 29, 2019.

(30) Foreign Application Priority Data

Aug. 31, 2018 (JP) ................................. 2018-163558

(51) Int. Cl.
*F04B 13/00* (2006.01)
*F02C 7/236* (2006.01)
(Continued)

(52) U.S. Cl.
CPC .............. *F02C 7/236* (2013.01); *F04B 13/00* (2013.01); *F04B 23/14* (2013.01); *F04B 53/10* (2013.01)

(58) Field of Classification Search
CPC .......... F02C 7/236; F02C 7/232; F04B 13/00; F04B 23/14; F04B 53/10; F04B 2205/09;
(Continued)

(56) References Cited

U.S. PATENT DOCUMENTS 5,118,258 A 6/1992 Martin
5,168,704 A 12/1992 Kast et al.
(Continued)

FOREIGN PATENT DOCUMENTS

JP 9-112293 A 4/1997
JP 2001-90579 A 4/2001
(Continued)

*Primary Examiner* — Kelsey E Cary
(74) *Attorney, Agent, or Firm* — Oblon, McClelland, Maier & Neustadt, L.L.P.

(57) ABSTRACT

A fluid supply system includes: a centrifugal pump; a starting pump that is connected to the centrifugal pump in series, is provided downstream of the centrifugal pump, and has a discharge flow rate less than that of the centrifugal pump; a measuring valve that is provided downstream of the centrifugal pump and the starting pump, measures an amount of fluid discharged from the centrifugal pump or the starting pump, and discharges the fluid to a downstream each time the fluid reaches a predetermined flow amount; a differential pressure valve that is provided downstream of the centrifugal pump and the starting pump, and is driven based on a differential pressure between an upstream pressure and a downstream pressure of the measuring valve; and a flow rate control valve that is provided downstream of the centrifugal pump and upstream of the differential pressure valve and has a valve opening speed that is set slower than that of the differential pressure valve.

6 Claims, 3 Drawing Sheets

(51) Int. Cl.
*F04B 23/14* (2006.01)
*F04B 53/10* (2006.01)

(58) Field of Classification Search
CPC ...... F04B 23/12; F04C 2/10; F04C 2210/203; F04C 2220/24; F04C 2270/21; F04C 11/005
See application file for complete search history.

(56) References Cited

U.S. PATENT DOCUMENTS

| | | |
|---|---|---|
| 8,205,597 B2 | 6/2012 | Brocard et al. |
| 2011/0139123 A1 | 6/2011 | Brocard et al. |
| 2011/0142691 A1 | 6/2011 | Adams et al. |
| 2011/0289925 A1 | 12/2011 | Dyer et al. |
| 2012/0260658 A1 | 10/2012 | Bader et al. |
| 2015/0125313 A1 | 5/2015 | Nyzen et al. |
| 2020/0400074 A1* | 12/2020 | Seki .......................... F02C 9/30 |

FOREIGN PATENT DOCUMENTS

| | | |
|---|---|---|
| JP | 2008-530442 A | 8/2008 |
| JP | 2011-247259 A | 12/2011 |
| JP | 5087696 B2 | 12/2012 |
| JP | 2013-506794 A | 2/2013 |
| JP | 2016-184489 A | 10/2016 |
| WO | WO 2015/046177 A1 | 4/2015 |

\* cited by examiner

FLUID SUPPLY SYSTEM

TECHNICAL FIELD

The present disclosure relates to a fluid supply system.

This application is a Continuation Application based on International Application No. PCT/JP2019/033849, filed on Aug. 29, 2019, which claims priority on Japanese Patent Application No. 2018-163558, filed on Aug. 31, 2018, the contents of which are incorporated herein by reference.

BACKGROUND ART

For example, Patent Document 1 discloses a fuel supply device (fuel supply system) that includes a main centrifugal pump and a starting pump and that supplies fuel to a gas turbine engine. The main centrifugal pump can supply the fuel after boosting the pressure of the fuel, but it is difficult to supply a small amount of fuel at a low rotation speed. Therefore, as disclosed in Patent Document 1, when starting the gas turbine engine where the amount of fuel supplied is small, the pressure of the fuel is boosted using a starting pump. Then, the starting pump and the main centrifugal pump are switched and driven to supply fuel to the gas turbine engine at an appropriate pressure and an appropriate flow rate. Patent Documents 2 to 4 also disclose fuel supply devices.

CITATION LIST

Patent Literature

[Patent Document 1]
 Japanese Unexamined Patent Application, First Publication No. 2011-247259
[Patent Document 2]
 PCT International Publication No. WO2015/046177
[Patent Document 3]
 Japanese Unexamined Patent Application, First Publication No. 2016-184489
[Patent Document 4]
 Japanese Unexamined Patent Application, First Publication No. 2001-90579

SUMMARY OF THE INVENTION

Technical Problem

In a fuel supply system in which a centrifugal pump and a starting pump are connected to each other in series, when switching from the starting pump to the centrifugal pump is performed, the fuel discharged from the centrifugal pump flows into a flow channel same as the flow channel of the fuel discharged from the starting pump. A measuring valve for measuring a flow rate of the fuel is provided at a subsequent stage of the starting pump, in the flow channel between the measuring valve and the starting pump, since the fuel discharged from the centrifugal pump flows in, a pressure in the flow channel changes rapidly. If the pressure rapidly changes at an upstream of the measuring valve, a differential pressure may occur between the upstream and the downstream of the measuring valve, and thus, pulsation may occur in the measurement flow rate.

In a fuel supply system in which a centrifugal pump and a starting pump are connected to each other in series, an object of the present disclosure is to suppress a rapid change in pressure at the upstream of the measuring valve when switching between the starting pump and the centrifugal pump is performed.

Solution to Problem

A fluid supply system in a first aspect of the present disclosure includes: a centrifugal pump; a starting pump that is connected to the centrifugal pump in series, is provided downstream of the centrifugal pump, and has a discharge flow rate less than that of the centrifugal pump; a measuring valve that is provided downstream of the centrifugal pump and the starting pump, measures an amount of fluid discharged from the centrifugal pump or the starting pump, and discharges the fluid to a downstream each time the fluid reaches a predetermined flow amount; a differential pressure valve that is provided downstream of the centrifugal pump and the starting pump, and is driven based on a differential pressure between an upstream pressure and a downstream pressure of the measuring valve; and a flow rate control valve that is provided downstream of the centrifugal pump and upstream of the differential pressure valve and has a valve opening speed that is set slower than that of the differential pressure valve.

In the fluid supply system in a second aspect of the present disclosure, in the fluid supply system according to the first aspect, the flow rate control valve is provided between a discharge port of the centrifugal pump and a suction port of the starting pump.

In the fluid supply system in a third aspect of the present disclosure, in the fluid supply system according to the first aspect, the flow rate control valve is provided in a bypass flow channel that connects an upstream side and a downstream side of the starting pump to each other.

In the fluid supply system in a fourth aspect of the present disclosure, in the fluid supply system according to any one of the first to third aspects, the valve opening speed of the flow rate control valve is ⅕ to ¹/₁₀ of the valve opening speed of the differential pressure valve.

In the fluid supply system in a fifth aspect of the present disclosure, in the fluid supply system according to any one of the first to fourth aspects, the flow rate control valve is configured to be opened after the centrifugal pump is driven.

According to the present disclosure, in the fluid supply system in which the centrifugal pump and the starting pump are connected to each other in series, the valve opening speed of the flow rate control valve is set slower than the valve opening speed of the differential pressure valve. As a result, when switching from the starting pump to the centrifugal pump is performed, the fuel supplied from the centrifugal pump gradually flows into the starting pump. Therefore, in the upstream of the measuring valve, since the change in the flow rate of the fuel becomes slow, it is possible to suppress the rapid change in the pressure of the fuel.

DETAILED DESCRIPTION OF THE EMBODIMENTS

Figure 1:
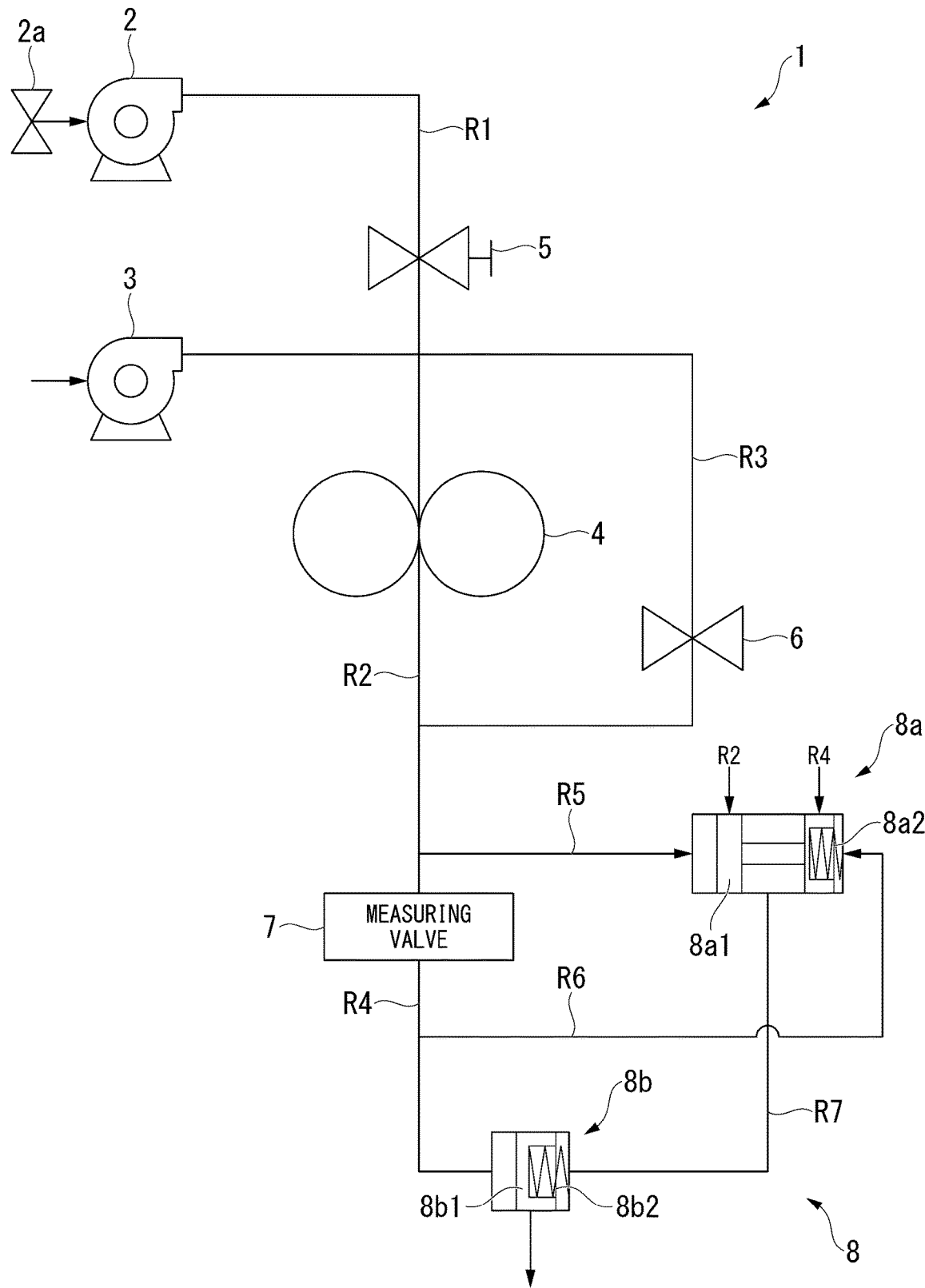
FIG. 1 is a schematic diagram representing a fuel supply system according to an embodiment of the present disclosure.

Hereinafter, a fuel supply system 1 as an embodiment of a fluid supply system according to the present disclosure will be described with reference to the drawings. In the present disclosure, the fuel supply system 1 may be regarded as a fluid supply system 1.

The fuel supply system 1 is a system for measuring an amount of fuel and supplying the fuel (fluid) to a jet engine, and includes a centrifugal pump 2, a boost pump 3, a fixed displacement pump 4 (a starting pump), a flow rate control valve 5, a bypass valve 6, a measuring valve 7, and a differential pressure detector 8.

The centrifugal pump 2 is a pump arranged at the most upstream in the fuel supply system 1 in the present embodiment. The centrifugal pump 2 includes a casing (not illustrated) in which an inlet and an outlet are formed, and an impeller (not illustrated) accommodated in the casing, and is a device that pressurizes the fuel that has flowed into the casing and sends out the fuel by rotating the impeller. In addition, the centrifugal pump 2 is provided with an inlet shut-off valve 2a in the inlet of the casing, and is connected to an external fuel reservoir (not illustrated) via the inlet shut-off valve 2a. The inlet shut-off valve 2a is provided so as to shut off the inlet of the casing, and the fuel is supplied to the casing by opening the valve. In addition, the centrifugal pump 2 is connected to an inlet flow channel R1 in the outlet of the casing (discharge port). In addition, the inlet flow channel R1 is provided with a check valve (not illustrated) at the preceding stage of the flow rate control valve 5.

The boost pump 3 is a device that includes an impeller and a casing (not shown) similarly to the centrifugal pump 2, and is a device that pressurizes the fuel that has flowed into the casing and sends out the fuel by rotating the impeller. The boost pump 3 has an inlet of the casing connected to an external fuel reservoir (not illustrated) separately from the centrifugal pump 2 and preliminarily pressurizes the fuel supplied from the fuel reservoir. In addition, a discharge port of the boost pump 3 is connected to a flow channel that is guided to the inlet flow channel R1. A check valve (not illustrated) is provided in the flow channel.

The fixed displacement pump 4 is a gear pump having a flowing inlet connected to the inlet flow channel R1, and is provided at the downstream of the centrifugal pump 2 and the boost pump 3. The fixed displacement pump 4 includes a casing (not illustrated) and a plurality of gears (not illustrated) that are accommodated in the casing and are engaged with each other. The fuel discharged from the boost pump 3 is supplied to the fixed displacement pump 4. Such a fixed displacement pump 4 is a pump that has a smaller discharge flow rate and discharge pressure compared to those of the centrifugal pump 2, and is driven when the fuel is supplied at a low flow rate, that is, when the engine is started. When the centrifugal pump 2 is driven, the fixed displacement pump 4 does not work but functions as a part of the flow channel in which the fuel passes.

The flow rate control valve 5 is a valve device provided between the outlet of the centrifugal pump 2 and the outlet of the boost pump 3. That is, the flow rate control valve 5 is arranged on the inlet flow channel R1 that guides the fuel discharged from the centrifugal pump 2 to the fixed displacement pump 4. In addition, the flow rate control valve 5 is controlled by, for example, a hydraulic pressure, and is opened and closed at a valve opening speed that is approximately $\frac{1}{5}$ of a valve opening speed that indicates a speed from the opening of the differential pressure valve 8a described later to the time of full opening.

The bypass valve 6 is a valve device provided in a bypass flow channel R3 that connects the inlet side (that is, the inlet flow channel R1) of the fixed displacement pump 4 and the outlet side (that is, the measurement flow channel R2) of the fixed displacement pump 4. The bypass valve 6 is a differential pressure sensing type that is driven by a differential pressure between the pressure at the downstream of the measuring valve 7 (that is, the outlet side of the fuel supply system 1) and the pressure on the outlet side of the fixed displacement pump 4, and functions as a relief valve that opens when the pressure on the outlet side of the fixed displacement pump 4 is higher than the pressure at the downstream of the measuring valve 7.

The measuring valve 7 is provided in the measurement flow channel R2 that is guided from the outlet of the fixed displacement pump 4 to the measuring valve 7, and is a device including a valve drive unit (not illustrated), a valve body, and a valve displacement meter. The valve drive unit is a device that drives the valve body by hydraulic pressure or the like. The valve body closes the measurement flow channel R2 and opens the measurement flow channel R2 for a predetermined period by being moved by the valve drive unit and supplies only a fixed amount of fuel to the outside. The valve displacement meter is a sensor that measures an amount of movement (degree of opening) of the valve body and feeds back the measurement data to the valve drive unit. Such a measuring valve 7 is connected to the outlet flow channel R4 at the downstream, measures the fuel flowing through the measurement flow channel R2, and discharges the fuel to the outlet flow channel R4 each time the fuel reaches a predetermined flow amount.

The differential pressure detector 8 includes a first differential pressure detection flow channel R5, a second differential pressure detection flow channel R6, a third differential pressure detection flow channel R7, a differential pressure valve 8a and a pressure control valve 8b. The first differential pressure detection flow channel R5 is a flow channel that is connected to the measurement flow channel R2, and is a flow channel to which the fuel at the upstream of the measuring valve 7 (the fuel between a point connected to the bypass flow channel R3 and the measuring valve 7 in the measurement flow channel R2) flows in. The second differential pressure detection flow channel R6 is a flow channel that is connected to the downstream of the measuring valve 7, and is a flow channel to which the fuel after passing through the measuring valve 7 (the fuel between the measuring valve 7 and the pressure control valve 8b in the outlet flow channel R4) flows in. The third differential pressure detection flow channel R7 is a flow channel that is connected to both the upstream of the measuring valve 7 and the downstream of the measuring valve 7 via the differential pressure valve 8a, and is a flow channel to which any one of the fuel at the upstream of the measuring valve 7 or the fuel at the downstream of the measuring valve 7 flows in depending on the position of the valve body 8a1 of the differential pressure valve 8a, which will be described later.

The differential pressure valve 8a is a valve device including a valve body 8a1 and a spring 8a2. The valve body 8a1 is provided between the first differential pressure detection flow channel R5 and the second differential pressure detection flow channel R6, and is driven by the fuel flowing through the first differential pressure detection flow channel R5 and the fuel flowing through the second differential pressure detection flow channel R6. The spring 8a2 biases the valve body 8a1 in the direction of closing the valve. The differential pressure valve 8a is in a closed state when the pressure of the first differential pressure detection flow channel R5 and the pressure of the second differential pressure detection flow channel R6 are balanced. Such a differential pressure valve 8a is a switching valve that switches the fuel flowing into the third differential pressure detection flow channel R7 by the valve body 8a1 being moved based on the differential pressure between the fuel in the first differential pressure detection flow channel R5 and the fuel in the second differential pressure detection flow channel R6. When the pressure of the fuel at the upstream of the measuring valve 7 (pre-measurement pressure) is higher than the pressure of the fuel after passing the measuring valve 7 (post-measurement pressure), the differential pressure valve 8a connects the third differential pressure detection flow channel R7 to the upstream of the measuring valve 7. In addition, when the post-measurement pressure is higher than the pre-measurement pressure, the differential pressure valve 8a connects the third differential pressure detection flow channel R7 to the downstream of the measuring valve 7. That is, the differential pressure valve 8a is driven based on the differential pressure of the pre-measurement pressure and the post-measurement pressure, and discharges any one of the fuel at the upstream of the measuring valve 7 or the fuel at the downstream of the measuring valve 7 to the downstream.

The pressure control valve 8b is a differential pressure valve that is provided so as to close the outlet of the outlet flow channel R4 and includes a valve body 8b1 and a spring 8b2. The valve body 8b1 is provided between the outlet flow channel R4 and the third differential pressure detection flow channel R7. The spring 8b2 biases the valve body 8b1 toward the direction of closing the valve (outlet flow channel R4 side). Such a pressure control valve 8b is driven based on the differential pressure between the pressure of the fuel flowing through the third differential pressure detection flow channel R7 and the pressure of the fuel (post-measurement pressure) flowing through the outlet flow channel R4, and is opened only when the post-measurement pressure is higher than the pressure of the fuel flowing through the third differential pressure detection flow channel R7. While the pressure control valve 8b is opened, the fuel at the downstream of the measuring valve 7 flows into the jet engine (not illustrated).

An operation of the fuel supply system 1 according to the present embodiment will be described. First, when the engine is started, the fuel is supplied from the boost pump 3 side and the fuel pressurized by the fixed displacement pump 4 flows into the measurement flow channel R2. At this time, the inlet shut-off valve 2a provided in the centrifugal pump 2 is closed, and the fuel does not flow into the centrifugal pump 2. The fuel flowed into the measurement flow channel R2 is measured by the measuring valve 7 and flows into the outlet flow channel R4 for each of a constant flow amount. In addition, a part of the fuel flowed into the outlet flow channel R4 flows into the first differential pressure detection flow channel R5.

In addition, during a normal operation in which a large amount of fuel is required, the inlet shut-off valve 2a of the centrifugal pump 2 is opened and the fuel flows into the centrifugal pump 2. Then, the fuel which flows into the inlet flow channel R1 after being pressurized by the centrifugal pump 2 enters the fixed displacement pump 4 by the flow rate control valve 5 being opened. In addition, a part of the fuel pressurized by the centrifugal pump 2 flows into the bypass flow channel R3. The bypass valve 6 is opened when the pre-measurement pressure is higher than the post-measurement pressure. Therefore, by the bypass valve 6 being opened, the fuel flowing through the bypass flow channel R3 joins the measurement flow channel R2.

Then, the fuel guided to the measuring valve 7 flows to the outlet side by the measuring valve 7 each time the fuel reaches a predetermined flow amount. In addition, a part of the fuel before measuring in the measurement flow channel R2 flows into the first differential pressure detection flow channel R5, and drives the differential pressure valve 8a based on the differential pressure with the pressure of the fuel (that is, the fuel after measurement) that similarly flowed into the second differential pressure detection flow channel R6. The differential pressure valve 8a moves such that the fuel before measurement is caused to flow to the third differential pressure detection flow channel R7 when the pre-measurement pressure is higher than the post-measurement pressure. Then, when the post-measurement pressure becomes higher than the pressure at the third differential pressure detection flow channel R7, the pressure control valve 8b is opened and the fuel is supplied to the engine (not illustrated).

Figure 2:
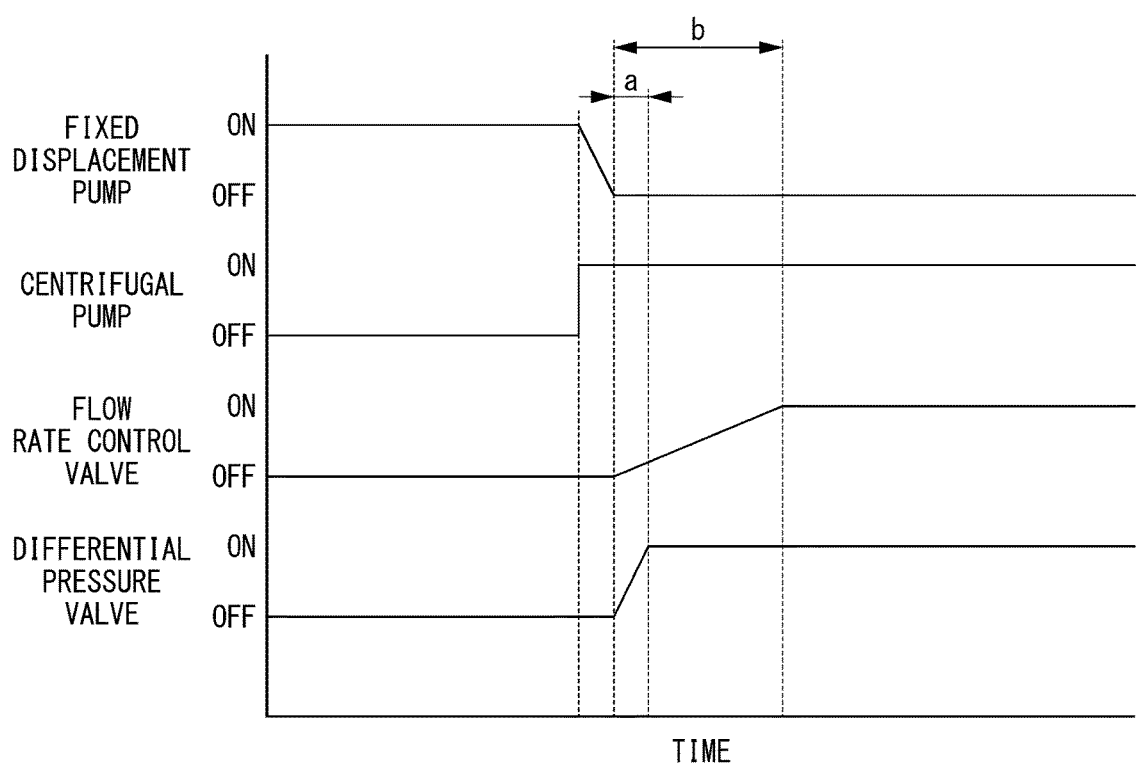
FIG. 2 is a time chart of each device in the fuel supply system according to the embodiment of the present disclosure.

An operation of the flow rate control valve 5 in the fuel supply system 1 will be described with reference to a time chart in FIG. 2. As illustrated in FIG. 2, after the centrifugal pump 2 is driven, the flow rate control valve 5 and the differential pressure valve 8a start to open simultaneously. When the flow rate control valve 5 starts to open, the fuel passed through the centrifugal pump 2 gradually starts to flow into the inlet flow channel R1. Then, the differential pressure valve 8a is in a fully opened state at an earlier stage than the flow rate control valve 5 is in a fully opened state. At this time, the flow rate of the fuel flowing from the centrifugal pump 2 into the inlet flow channel R1 is smaller than the flow rate of fuel measured by the measuring valve 7, and the differential pressure valve 8a is in a state of connecting the third differential pressure detection flow channel R7 to the upstream of the measuring valve 7. In the fuel supply system 1 according to the present embodiment, when the supply flow rate of the fuel supplied from the centrifugal pump 2 increases higher than the flow rate of fuel measured by the measuring valve 7, the pre-measurement pressure increases. When the differential pressure valve 8a is fully opened and the flow rate control valve 5 is in the process of opening, since the above-described supply flow rate can be suppressed to be small compared to the flow rate of fuel measured by the measuring valve 7, a rapid increase of the pre-measurement pressure is suppressed. When the flow rate control valve 5 is fully opened, even if the supply flow rate flowing into the inlet flow channel R1 increases, since the supply flow rate flowing into the inlet flow channel R1 balances with the measurement flow rate, the pre-measurement pressure becomes constant. Therefore, by making the change in the supply flow rate of the fuel supplied from the centrifugal pump 2 slow, the change in the pressure of the pre-measurement pressure becomes slow. Therefore, according to the present embodiment, in the process of switching the operation from the fixed displacement pump 4 to the centrifugal pump 2, it is possible to prevent a rapid increase in the pre-measurement pressure. Here, by opening and closing the differential pressure valve 8a and opening and closing the pressure control valve 8b, the pressure of the fuel supplied from the pressure control valve 8b to the engine is kept substantially constant regardless of the change in the supply flow rate of the fuel.

According to the present embodiment, by opening the flow rate control valve 5 at a valve opening speed slower than that of the differential pressure valve 8a, the supply flow rate of the fuel supplied from the centrifugal pump 2 can be controlled. Therefore, after the start of the centrifugal pump 2, the change in the pre-measurement pressure becomes slow by preventing a rapid increase in the pre-measurement pressure, it is possible to prevent the differential pressure from occurring between the pre-measurement pressure and the post-measurement pressure. As a result, it is possible to prevent the pulsation from occurring in the measurement flow rate of the measuring valve 7. Therefore, it is possible to perform measuring accurately in the measuring valve 7.

In addition, according to the present embodiment, the flow rate control valve 5 is provided between the discharge port of the centrifugal pump 2 and the suction port of the fixed displacement pump 4. In this way, it possible to control the flow rate for the entire amount of the fuel supplied from the centrifugal pump 2, and thus, the pre-measurement pressure can be reliably controlled.

In addition, according to the present embodiment, the flow rate control valve 5 is opened at a speed of approximately ⅕ of the valve opening speed of the differential pressure valve 8a. That is, in FIG. 2, if a valve opening time during which the differential pressure valve 8a changes from the closed state to an opened state is assumed to be a, and a valve opening time during which the flow rate control valve 5 changes from the closed state to the opened state is assumed to be b, then b is approximately equal to 5a. As a result, the flow rate control valve 5 has a sufficiently slow valve opening speed with respect to the differential pressure valve 8a, and the change in the pre-measurement pressure can be made sufficiently slow.

In addition, according to the present embodiment, the flow rate control valve 5 starts to open after the centrifugal pump 2 is driven. As a result, the flow rate control valve 5 is opened in a state in which the flow channel from the centrifugal pump 2 to the flow rate control valve 5 is filled with the fuel, and thus, it is possible to prevent bubbles from being mixed into the inlet flow channel R1.

The embodiment of the present disclosure is described above with reference to the drawings, but the present disclosure is not limited to the above embodiment. The shapes, combinations, and the like of the configuration members shown in the above-described embodiment are examples, and can be variously changed based on design requirements and the like.

Figure 3:
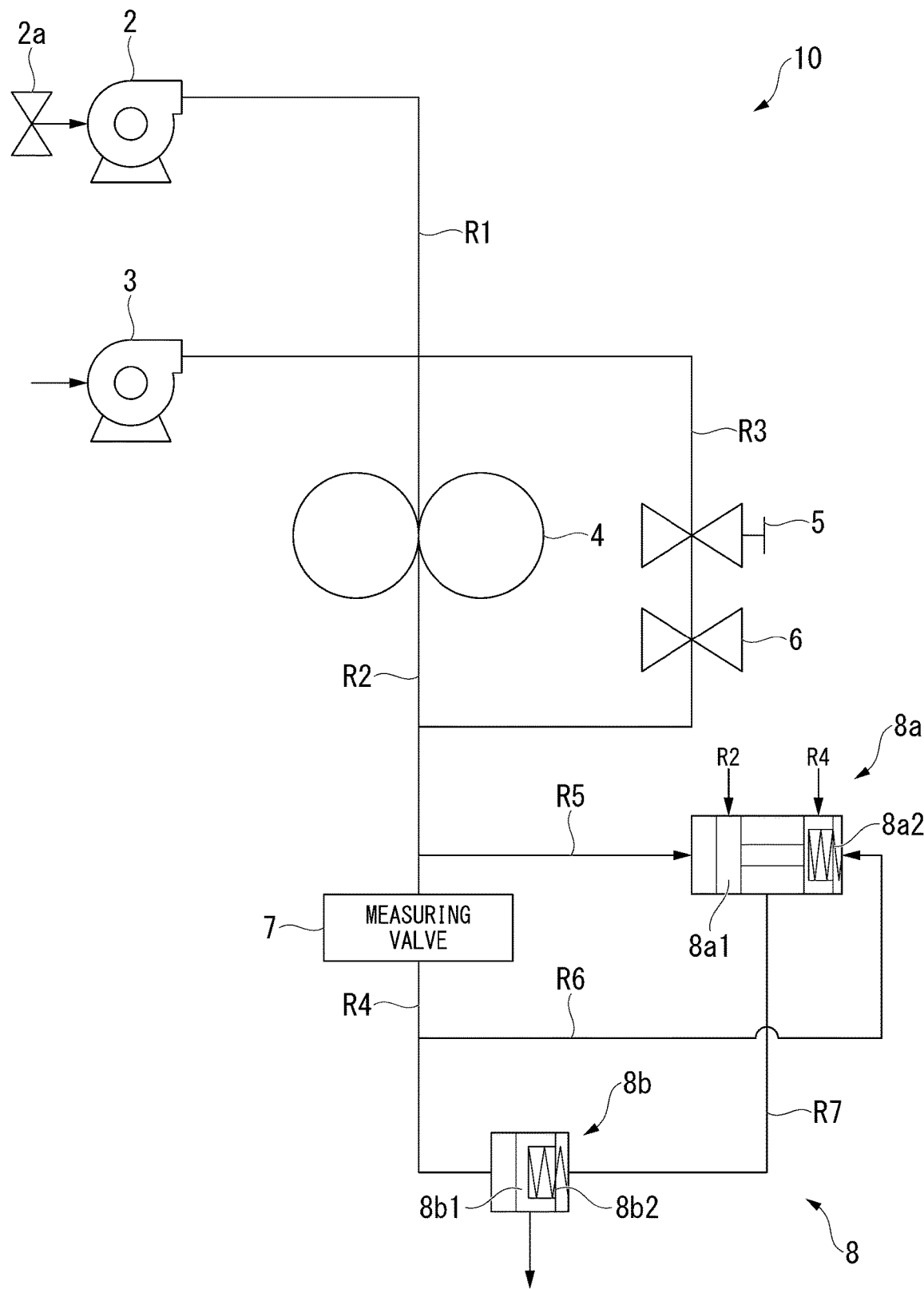
FIG. 3 is a schematic diagram representing a fuel supply system according to a modification example of the embodiment of the present disclosure.

In the embodiment described above, the flow rate control valve 5 is provided between the discharge port of the centrifugal pump 2 and the suction port of the fixed displacement pump 4, but the present disclosure is not limited thereto. FIG. 3 is a schematic diagram of a fuel supply system 10 according to a modification example of the embodiment of the present disclosure. As illustrated in FIG. 3, the flow rate control valve 5 may be provided in the bypass flow channel R3. In this case also, by making the change in the flow rate of the fuel in the bypass flow channel R3 slow, it is possible to prevent a rapid change in the pre-measurement pressure.

In addition, the valve opening speed of the flow rate control valve 5 may be in the range of approximately ⅕ to ¹⁄₁₀ of the valve opening speed of the differential pressure valve 8a. That is, in FIG. 2, if the valve opening time during which the differential pressure valve 8a changes from the closed state to an opened state is assumed to be a, and the valve opening time during which the flow rate control valve 5 changes from the closed state to the opened state is assumed to be b, b may be in the range of approximately 5a to approximately 10a. When the valve opening speed of the flow rate control valve 5 is slowed down to equal to or more than ¹⁄₁₀, since the time it takes to switch from the fixed displacement pump 4 to the centrifugal pump 2 becomes long in the fuel supply system 1, it may impair the responsiveness of the entire system. However, in the fuel supply system 1, if a quick response is not required when switching the pump, the valve opening speed can be slower than ¹⁄₁₀.

In addition, as one embodiment of the fluid supply system according to the present disclosure, in the above embodiment, the fuel supply system that supplies the liquid or the incompressible fluid fuel to the jet engine is described, but the present disclosure is not limited thereto. As long as the fluid supply system includes the centrifugal pump 2 and the fixed displacement pump 4 and drives each pump by switching each pump, the type and usage of the fluid are not limited.

In addition, the driving method of the flow rate control valve 5 is not particularly limited, and it can be driven by various methods such as electric type and hydraulic type.

INDUSTRIAL APPLICABILITY

According to the fluid supply system in the present disclosure, in the upstream of the measuring valve, since the change in the flow rate of the fuel at the time of switching between the starting pump and the centrifugal pump becomes slow, it is possible to suppress the rapid change in the pressure of the fuel.

What is claimed is:
1. A fluid supply system comprising:
a centrifugal pump;
an inlet shut-off valve provided upstream of the centrifugal pump and configured to allow or shut off an inflow of a fuel into the centrifugal pump by opening and closing;
a starting pump that is connected to the centrifugal pump in series, is provided downstream of the centrifugal pump, and has a discharge flow rate less than that of the centrifugal pump;
a measuring valve that is provided downstream of the centrifugal pump and the starting pump, measures an amount of fluid discharged from the centrifugal pump or the starting pump, and discharges the fluid to a downstream each time the fluid reaches a predetermined flow amount;
a differential pressure valve that is provided downstream of the centrifugal pump and the starting pump, and is driven based on a differential pressure between an upstream pressure and a downstream pressure of the measuring valve; and
a flow rate control valve that is provided downstream of the centrifugal pump and upstream of the differential pressure valve and has a valve opening speed that is set slower than that of the differential pressure valve,
wherein the valve opening speed of the flow rate control valve is 1/5 to 1/10 of the valve opening speed of the differential pressure valve.
2. The fluid supply system according to claim 1,
wherein the flow rate control valve is provided between a discharge port of the centrifugal pump and a suction port of the starting pump.
3. The fluid supply system according to claim 2,
wherein the flow rate control valve is configured to be opened after the centrifugal pump is driven.

4. The fluid supply system according to claim 1,
wherein the flow rate control valve is provided in a bypass flow channel that connects an upstream side and a downstream side of the starting pump to each other.

5. The fluid supply system according to claim 4,
wherein the flow rate control valve is configured to be opened after the centrifugal pump is driven.

6. The fluid supply system according to claim 1,
wherein the flow rate control valve is configured to be opened after the centrifugal pump is driven.

* * * * *